E. M. COBB.
SAFETY YIELDABLE GEARING.
APPLICATION FILED JAN. 28, 1910.
970,991.
Patented Sept. 20, 1910.
2 SHEETS—SHEET 1.
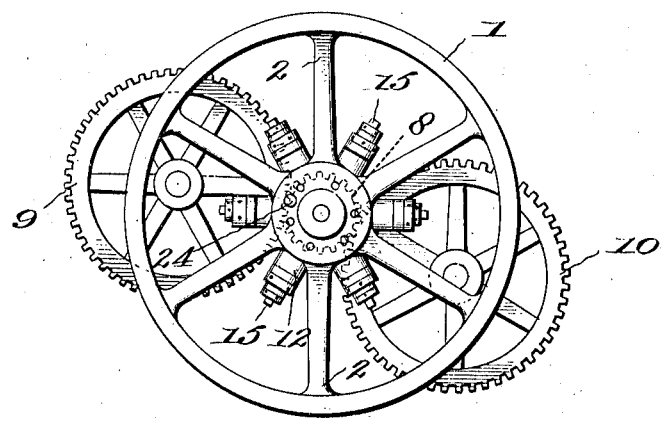

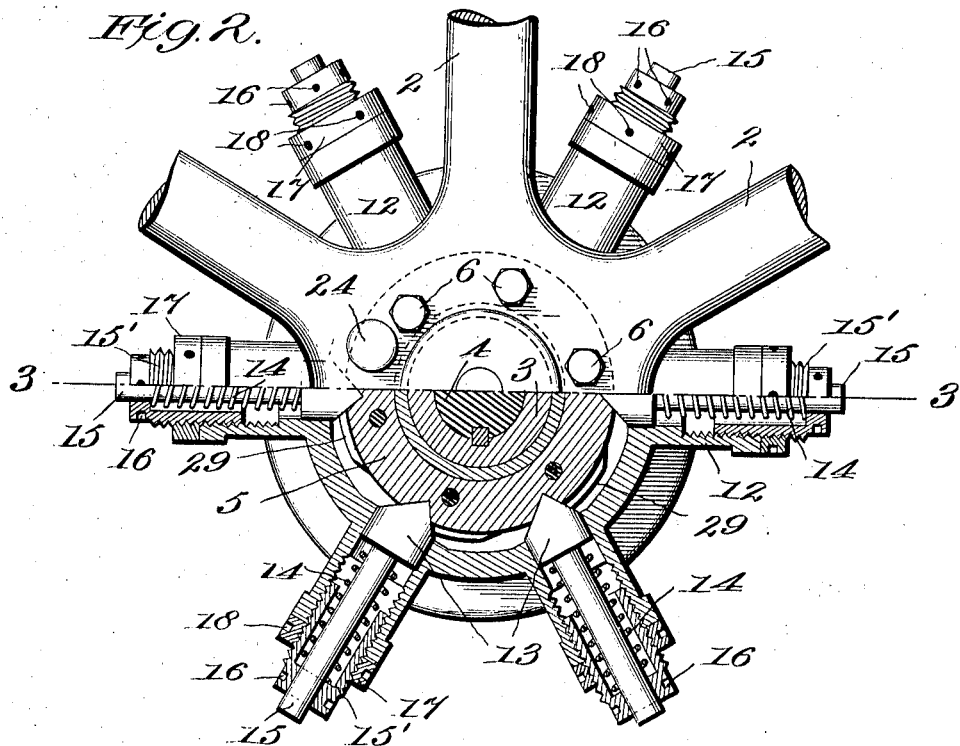
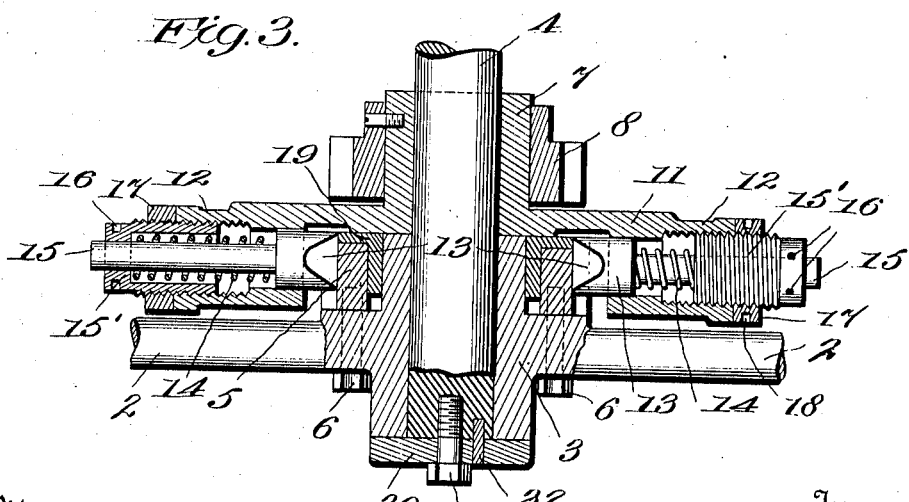

UNITED STATES PATENT OFFICE.

ELMER M. COBB, OF SOUTH PORTLAND, MAINE, ASSIGNOR TO EDWARD M. LANG, JR., OF PORTLAND, MAINE.

SAFETY YIELDABLE GEARING.

970,991.  Specification of Letters Patent.  Patented Sept. 20, 1910.

Original application filed November 24, 1909, Serial No. 529,829. Divided and this application filed January 28, 1910. Serial No. 540,676.

*To all whom it may concern:*

Be it known that I, ELMER M. COBB, a citizen of the United States, residing at South Portland, in the county of Cumberland and State of Maine, have invented certain new and useful Improvements in Safety Yieldable Gearing; and I do hereby declare the following to be a full, clear, and exact description of the invention, such as will enable others skilled in the art to which it appertains to make and use the same.

My invention relates to improvements in safety yieldable gearing.

The object of my invention is to provide means whereby a constantly running pulley may be disconnected from the mechanism driven thereby in case of any sudden and undue strain upon such driven mechanism, thereby preventing injury to the machine or mechanism.

This invention is intended especially to be applied to machines for making solder hemmed caps, and is a division of my former application, filed November 24, 1909, Serial No. 529,829. My invention, however, is not restricted to such machines, but may be applied to machines generally, and especially to those machines subject to sudden changes of load.

With the objects stated in view, my invention consists in the construction and combinations of parts as hereinafter described and claimed.

In the accompanying drawings—Figure 1 is a side view of a portion of a hemmed cap machine, showing my invention applied thereto. Fig. 2 is an enlarged detail view, partly in section, showing the hub and related parts of the safety clutch. Fig. 3 is a cross section thereof on the line 3—3 of Fig. 2. Fig. 4 is a horizontal section of a part of the hub, and Fig. 5 is a side view, partly in section, of the clutch disks.

1 represents the main driving pulley driven by a belt, not shown, from any suitable source of power. This pulley is provided with spokes 2 and an elongated hub 3, extending inwardly, as shown in Fig. 3.

4 represents the main shaft, on which the pulley 1 revolves freely, except when it is keyed to it, as hereinafter described. Bolted to the hub 3 is a ring 5, being secured thereto by bolts 6, and this ring is provided with a series of depressions in its face, one side of each depression being blunt and the other more sharply inclined, as shown in Fig. 2.

Keyed or otherwise fastened to the shaft 4 is a hub 7, to which is fastened the driving gear wheel 8, which meshes with the gear wheels 9 and 10, thereby driving the machinery. Of course, only one driven gear wheel may be used, if desired, and the character of the transmission gear from the main shaft 4 to the machine may be varied as desired.

The hub 7 has fastened thereto, or made integral therewith, a disk 11, from which project at intervals tubes 12, which are internally screw-threaded. Within each of these tubes 12 is mounted a plunger or pawl 13, having a rather blunt pointed end, one side of said pointed end being inclined considerably more than the other, as shown in Fig. 2, this plunger being adapted to seat in the depressions cut in the circumferential face of the ring 5. Each of these plungers is normally forced inward toward the shaft 4 by a spring 14, which is secured around the stem of the plunger and presses against the head thereof and against a cap 15', which is adapted to screw into the tube 12, whereby the tension of the spring 14 may be adjusted, the stem 15 of the plunger passing freely through a perforation in said cap. The cap 15' is provided with holes 16, with which a wrench may be engaged, and a lock nut 17 is provided, having perforations 18 for engagement with the wrench.

The construction of all the tubes 12, as shown in Fig. 2, is identical.

Adjacent to the disk 11, but not attached thereto, is the annular disk 19, L-shaped in cross section, as shown in Fig. 3, the inner part of which projects between the ring 5 and the hub 3 of the pulley. The ring 5 is also provided with a series of radial holes, in each of which is mounted a leather disk 20, a spring 21 and an adjusting screw 22, by means of which the disk 19 is continued in its forward movement, by the movement of the pulley 1, thereby engaging with the plungers 13 mounted in the disk 11, preventing said plungers from again engaging with the ring 5 until properly positioned. The hub 3 is also provided with a perforation through which passes a pin 23, having an adjusting head 24 screw-threadel thereon.

A spring 25 normally tends to press said pin outwardly. The inner part of this pin is enlarged, as shown, at 26, passing through a perforation in the ring 5, and the ring 19 is also provided with a perforation 27, Fig. 4. The ring 19 is also provided on its periphery with depressions 28 corresponding to the depressions in the circumferential face of the ring 5, and is also provided with raised portions 29, so that if, for any reason, the plungers should be disengaged from the ring 5, the pulley 1 would be permitted to revolve freely as these plungers ride on the raised portions 29. Consequently, the plungers 13, as the pulley 1 revolves, will not enter the depressions in the ring 5 every little while, which action, if it occurred, would produce a racking strain very injurious to the machine.

The pulley 1 is secured on the shaft 4 in the following manner: 30 represents a cap which is screwed onto the main shaft by means of a bolt 31, said cap being of the same diameter as the hub of the pulley, and 32 represents a removable pin, which passes through the cap 30 and into the shaft 4, to prevent the bolt 31 from being unscrewed by the revolution of the pulley 1.

The operation is as follows: If any undue resistance should occur, such as, for example, that due to a wrench or other piece of iron falling into the gearing, the pulley 1 will continue to revolve and the plungers 13 will be forced out of the notches in the ring 5, and will be carried along by friction until they ride on the raised portions 29 of the ring 19, whereupon the pulley will revolve freely without driving any part of the machine. After the obstruction is removed, the parts may be easily adjusted back into the original position, by causing the pulley 1 to be revolved slightly relatively to the ring or sleeve 5 and the shaft 4, which can be done easily by turning the pulley backward and pressing in the pin 26 against the tension of the spring 25 until, during the revolution, it enters the hole 27 in the disk 19, whereby the grooves in the ring 5 and the ring 19 are locked in proper alinement with each other by the plungers 13.

I claim:—

1. In a machine of the character described, the combination of driven mechanism, including a main shaft, and safety devices, including a pulley loosely mounted on said shaft and provided with notches on its hub, a casting secured to said shaft, spring-pressed pawls mounted in said casting and adapted normally to engage the notches in the hub of said pulley, and a notched disk carried by said casting on which said pawls are adapted to ride, when by reason of any obstruction to the driven mechanism, said pawls are disengaged from the notches in said hub, substantially as described.

2. In a machine of the class described, the combination of driven mechanism, including a main shaft, and safety devices, including a pulley loosely mounted on said shaft and provided with a notched hub, a casting secured to said shaft, spring-pressed pawls mounted in said casting and adapted normally to engage the notches in said hub, and a disk secured within said hub, said disk being provided with notches corresponding to the notches in the hub with portions of the same diameter as the diameter of the hub, and with other portions of greater diameter, substantially as described.

3. In a machine of the character described, the combination of driven mechanism, including a main shaft, and safety devices, including a pulley loosely mounted on said shaft and having a notched hub, a casting secured to said shaft and provided with projecting tubes, spring-pressed pawls in said tubes, adjusting means, and a notched disk secured within said hub, having portions thereon of greater diameter than the diameter of said hub, substantially as described.

4. In a machine of the character described, the combination of driven mechanism, including a main shaft, and safety devices, including a pulley having a notched hub loosely mounted on said shaft, means for securing said pulley on said shaft, a casting secured to said shaft and provided with projecting tubes, pawls in said tubes, springs normally pressing said pawls inwardly, means for adjusting the tension of said springs, and a notched disk secured within the hub, having portions thereon greater in diameter than the diameter of the hub of said pulley, substantially as described.

5. The combination of a shaft, a pulley having a notched hub loosely mounted thereon, a casting secured to said shaft, spring-pressed pawls carried by said casting and normally adapted to engage the notches in said hub, and a notched ring located between said casting and said hub, and having raised portions thereon of greater diameter than the diameter of the hub of the pulley, substantially as described.

6. The combination of a shaft, a pulley having a notched hub loosely mounted thereon, means for retaining said pulley on said shaft, a casting secured to said shaft and provided with a series of tubes, an adjustable spring-pressed pawl in each of said tubes, and a notched disk between said casting and said hub, having portions of greater diameter than the diameter of the hub of the pulley, substantially as described.

7. In a machine of the character described, the combination of driven mechanism, including a main shaft, and safety devices, including a pulley loosely mounted on said shaft and a notched hub, a disk secured within said hub, said disk being provided with notches corresponding to the notches in the hub, with portions of the same diameter as the diameter of the hub, and with other portions of greater diameter, and a casting secured to said shaft, spring-pressed pawls mounted therein, and adapted normally to engage the notches in said hub, substantially as described.

8. In a machine of the character described, the combination of driven mechanism, including a main shaft, and safety devices, including a pulley loosely mounted on said shaft and having a notched hub, a notched disk secured within said hub, having portions thereon of greater diameter than the diameter of the hub of the pulley, a casting secured to said shaft and provided with projecting tubes, spring-pressed pawls in said tubes, and adjusting means for said pawls, substantially as described.

9. In a machine of the character described, the combination of driven mechanism, including a main shaft, and safety devices therefor, including a pulley having a notched hub loosely mounted on said shaft, means for securing said pulley on said shaft, a notched disk secured within said hub, having portions thereon of greater diameter than the diameter of the hub of said pulley, a casting secured to said shaft and provided with projecting tubes, pawls in said tubes, springs normally pressing said pawls inwardly, and means for adjusting the tension of said springs, substantially as described.

In testimony whereof, I affix my signature, in presence of two witnesses.

ELMER M. COBB.

Witnesses:
K. M. TWIGG,
ALDEN STRONG.